3,201,192
PROCESS FOR THE PURIFICATION AND ACTIVATION OF TITANIUM TRICHLORIDE
Erhard Siggel, Laudenbach (Main), Gerhard Meyer, Obernburg (Main), and Wolfgang Rösener, Erlenbach (Main), Germany, assignors to Vereinigte Glanzstoff-Fabriken AG, Wuppertal-Elberfeld, Germany
No Drawing. Filed Sept. 5, 1961, Ser. No. 135,782
Claims priority, application Germany, Sept. 7, 1960, V 19,312
2 Claims. (Cl. 23—87)

The present invention is directed to a process for activating and purifying titanium trichloride and to the use of said titanium trichloride in olefin polymerization reactions. More particularly, the present invention is directed to a process for obtaining substantially pure and active titanium trichloride from titanium tetrachloride.

Titanium trichloride is often used as a catalyst in polymerizing olefins, especially in polymerizing propylene. One of the best known and most advantageous methods for producing titanium trichloride includes the step of reducing titanium tetrachloride. The reduction of titanium tetrachloride to form titanium trichloride can be carried out at high temperatures with hydrogen or by a simpler process with aluminum organic compounds.

When using titanium trichloride in the polymerization of alpha-olefins it is essential that a high degree of purity be obtained. This means that the titanium trichloride should be free or substantially free from titanium tetrachloride. Literature references which are directed to olefin polymerization processes or the manufacture of catalysts which are used in such processes frequently point out that the titanium trichloride must be purified. For the production of high crystalline and purified titanium trichloride, it is necessary to wash the material repeatedly with heptane (see Natta, SPE Journal, May 1959).

Even though the titanium trichloride is washed repeatedly with heptane, it still does not have the degree of purity which is required for the polymerization of olefins. This is established by the fact that the yield of isotactic polymerizate is too low. When titanium trichloride, which has been purified by repeated washings with heptane, is used as a catalyst, the yield of isotactic polymerizate is only about 70% to 80%. This is true even though claims have been made that greater yields are obtainable. Yields of 90% of isotactic polypropylene, for example, are not accurate insofar as they refer to the proportion of isotactic polypropylene after the separation of the polymerizate from the liquids used in the polymerization process. It is known that the polymerization is carried out in dispersion agents such as n-heptane. At the end of the process alcohol is added to the polymerizate dispersion which is then syphoned off with the bulk of the polymerizate. A portion of the atactic polymerizate substances, however, remains dissolved in the dispersion agent and is syphoned off with said agent. This can easily be determined by evaporation. Depending on the nature of the dispersion agent, it may contain from about 5% to 20% atactic polymerizate based on the total polymerizate. This quantity of polymerizate must be taken into account when calculating the yield of isotactic polymerizate, that is, this amount must be added to the percentage of the atactic substances contained in the solid polymerizate.

It is an object of the present invention to provide an improved method of purifying titanium trichloride.

Another object of the invention is to provide an improved method of producing substantially pure and activated titanium trichloride from titanium tetrachloride.

Still another object is to provide an improved process for polymerizing olefins.

Other objects of the invention will become apparent to those skilled in the art from the following detailed description.

In general, the present invention comprises the discovery that substantially pure titanium trichloride, which is free of titanium tetrachloride, can be obtained if the titanium trichloride is treated with organometallic compounds in the presence of an aliphatic, cycloaliphatic or aromatic hydrocarbon after preliminary purification of the titanium trichloride by washing with inert hydrocarbons. The quantity of organometallic compounds which is used in the treatment step varies from about 10 to about 200 mol percent, and preferably 50 to 100 mol percent, based on the quantity of titanium trichloride. The treatment can be carried out with brisk agitation at room temperature or slightly increased temperature, or the reaction can be carried out rapidly by heating under reflux. It is important, however, that a treatment temperature of 100° C. is not exceeded.

The organometallic compounds which can be used in the process include those compounds which are known as Ziegler catalysts for the polymerization of olefins. These catalysts are described in U.S. Patent 2,699,457, the disclosure of which is incorporated herein by reference. Such compounds include compounds having the formula $Me(R)_n$ wherein Me is a metal selected from the group consisting of aluminum, gallium, indium, and beryllium; $n$ is the valence of the metal, i.e., 2 or 3, and R is at least one of hydrogen, monovalent saturated aliphatic radicals, monovalent aromatic radicals, and combinations thereof. Suitable organometallic compounds would include aluminum triethyl, aluminum tri-isobutyl, beryllium diethyl, aluminum triphenyl, indium trimethyl, gallium trimethyl, gallium triphenyl, and the like.

Both the inert hydrocarbons that are used along with the organometallic compound and those inert hydrocarbons which are used in the preliminary washing step of the process would include alkanes, cycloalkanes, aromatic or alkyl aromatic hydrocarbons having from 5 to 15 carbon atoms. Suitable inert hydrocarbons would include n-heptane, hexane, isooctane, benzene, ethylbenzene, diethylbenzene, triethylbenzene, methylpropyl benzene, phenylbutane, phenylpentane, toluene, xylene, ethyl toluene, cymene, cyclobutane, cyclopentane, cyclohexane, methyl cyclohexane, cycloheptane, pentane, nonane, dodecane, decaline, tetraline, and benzine fractions having boiling points ranging from 50° to 200° C. among others.

In the purification process, the titanium trichloride initially is washed at least once with an inert hydrocarbon and preferably is washed at least twice with an inert hydrocarbon. Thereafter, the titanium trichloride is contacted with the organometallic compound-hydrocarbon mixture at a temperature not exceeding 100° C. In our preferred embodiment, the titanium trichloride is heated with the organometallic compound-inert hydrocarbon mixture under reflux. Purification may also be carried out at room temperature in which case the reaction mixture must be vigorously agitated. The treatment time can vary over a wide range, depending upon the temperature employed, for example, from 30 minutes to 24 hours.

If titanium trichloride is purified in accordance with this invention and is used in a known manner together with an aluminum organic compound such as an aluminum trialkyl as a catalyst in the polymerization of olefins, an increase of yield of isotactic polymerizate of 10% and more can be obtained.

In the following examples the process is illustrated and is also compared with a prior art process.

*Example I*

Four (4) g. of titanium trichloride, which was produced by the reduction of titanium tetrachloride with hydrogen at 800° C., was washed with 50 cc. n-heptane for 15 minutes at 20° C. and then syphoned. The n-heptane had previously been purified by distillation over metallic sodium and was stored over sodium wire and under a nitrogen atmosphere. The washing with n-heptane was repeated. Thereafter, the titanium trichloride with n-heptane to which 100 mol percent of aluminum triethyl (based on the amount of titanium trichloride) had been added was heated for two hours under reflux. After syphoning off the heptane, the above described washing with n-heptane was repeated twice.

The titanium trichloride which was purified as described above was placed in a 7 liter enamelled autoclave along with 10 cc. of aluminum triethyl and 5 liters of n-heptane. The autoclave was equipped with a stirring device and had a 20 liter useable capacity. The reaction mixture was heated to 75° C. Thereafter, enough propylene was added to increase pressure in the autoclave by 4 atmospheres and the polymerization was continued until the polymerizate concentration was about 20%. The remaining propylene pressure was then removed and the autoclave contents were transferred to a vessel containing about 4 liters of a 1% hydrochloric acid solution in ethanol. The catalyst was dissolved by brisk stirring. After cooling to 20° C. the polymerizate was syphoned off and washed with water until a neutral reaction was obtained. The dried polymerizate was extracted in a hot extractor with n-heptane for 24 hours. The total soluble polymerizate portion in n-heptane amounted to 11.0%. The portion of isotactic polypropylene, therefore, was 89.0%.

*Example II*

In this example, a quantity of 10 g. of titanium trichloride, which was produced and preliminarily purified as described in Example I, was heated to 20° C. for 24 hours with n-heptane to which had been added 100 mol percent of aluminum triethyl (based on the amount of titanium trichloride). Thereafter, the heptane was syphoned off and the titanium trichloride was washed twice with n-heptane as was described in Example I and was placed in a 7 liter enamelled autoclave along with 35 cc. of aluminum triethyl and 5 liters of n-heptane. The autoclave was heated to 75° C., whereupon 4 atmospheres of propylene was added to the autoclave. After the polymerization process had been completed, the polymerizate was purified as described in Example I. The total soluble polymerizate portion in n-heptane amounted to 12% and, therefore, the isotactic polypropylene amounted to 88%.

*Example III*

This example illustrates the results that are obtained by following prior art procedures. In this example a quantity of 4 g. of titanium trichloride, which was produced as described in Example I, was washed six times with 50 cc. n-heptane at 20° C. The titanium trichloride was placed in a 7 liter enamelled autoclave having a stirring device along with 10 cc. aluminum triethyl and 5 liters of n-heptane. The autoclave was heated to 75° C. and 4 atmospheres propylene was added to the vessel. After completion of the polymerization reaction the polymerizate was purified and dried as described in Example I. The polymerizate contained a total of 30% of substances which were extractable with n-heptane and, therefore, 70% of isotactic polypropylene was obtained.

Obviously many modifications and variations of the invention as hereinbefore set forth may be made without departing from the spirit and scope thereof, and therefore only such limitations should be imposed as are indicated in the appended claims.

We claim:
1. A process for the activation of titanium trichloride which has been produced by the reduction of titanium tetrachloride which is contaminated with titanium tetrachloride, and which has thereafter been washed with an inert hydrocarbon, said titanium trichloride to be used for the polymerization of olefins, which process comprises: heating said titanium trichloride with agitation at a temperature not exceeding 100° C. in the absence of olefin but in the presence of an organometallic polymerization catalyst-inert hydrocarbon mixture, the amount of said organometallic polymerization catalyst in said vessel being from about 10 to about 200 mol percent based on the amount of titanium trichloride that is present in the vessel, separating off said organometallic polymerization catalyst-inert hydrocarbon mixture, and thereafter washing the titanium trichloride once again with an inert hydrocarbon, whereby an activated and substantially moisture and titanium tetrachloride free catalyst is obtained.

2. A process for the activation of titanium trichloride which has been produced by the reduction of titanium tetrachloride which is contaminated with titanium tetrachloride, and which has thereafter been washed with an inert hydrocarbon, said titanium trichloride to be used for the polymerization of olefins, which process comprises: heating said titanium trichloride with agitation at a temperature not exceeding 100° C. in the absence of olefin but in the presence of an organometallic polymerization catalyst-inert hydrocarbon mixture, the amount of said organometallic polymerization catalyst in said vessel being from about 50 to about 100 mol percent based on the amount of titanium trichloride that is present in the vessel, separating off said organometallic polymerization catalyst-inert hydrocarbon mixture, and thereafter washing the titanium trichloride once again with an inert hydrocarbon, whereby an activated and substantially moisture and titanium tetrachloride free catalyst is obtained.

References Cited by the Examiner

UNITED STATES PATENTS

| | | | |
|---|---|---|---|
| 2,880,199 | 3/59 | Jezl. | |
| 2,909,511 | 10/59 | Thomas. | |
| 2,925,392 | 2/60 | Seelbach et al. | 252—441 X |
| 2,938,890 | 5/60 | D'Alelio | 260—94.9 |
| 3,063,798 | 11/62 | Langer et al. | 23—87 |

MAURICE A. BRINDISI, *Primary Examiner.*

GEORGE D. MITCHELL, *Examiner.*